Oct. 27, 1942.  L. A. PARADISE ET AL  2,299,925
TRACTOR MOUNTED PICKER-SHELLER
Filed Jan. 2, 1941   3 Sheets-Sheet 2

INVENTOR:
LOUIS A. PARADISE
WILBUR J. COULTAS
BY
ATTORNEYS.

Oct. 27, 1942.                L. A. PARADISE ET AL                2,299,925
                           TRACTOR MOUNTED PICKER-SHELLER
                           Filed Jan. 2, 1941        3 Sheets-Sheet 3

INVENTOR:
LOUIS A. PARADISE
WILBUR J. COULTAS
BY
ATTORNEYS.

Patented Oct. 27, 1942

2,299,925

UNITED STATES PATENT OFFICE 2,299,925

TRACTOR MOUNTED PICKER-SHELLER

Louis A. Paradise and Wilbur J. Coultas, Moline, Ill., assignors to Deere & Company, Moline, Ill., a corporation of Illinois Application January 2, 1941, Serial No. 372,700

1 Claim. (Cl. 56—18)

The present invention relates generally to agricultural implements and more particularly to corn harvesters, and has for its principal object the provision of a novel corn harvesting implement adapted to be mounted on a tractor for operation integrally therewith, for snapping ears of corn from the standing stalks in the field, husking the ears and shelling the kernels of corn from the cobs, separating the shelled kernels from the husks and cobs, and delivering the shelled corn to a suitable wagon or truck which is driven alongside or in rear of the tractor.

These and other objects and advantages of our invention will be apparent after a consideration of the following description, in which reference is had to the drawings appended hereto, in which Figure 1 is a partial plan view of a tractor mounted picker sheller embodying the principles of the present invention;

Figure 1:
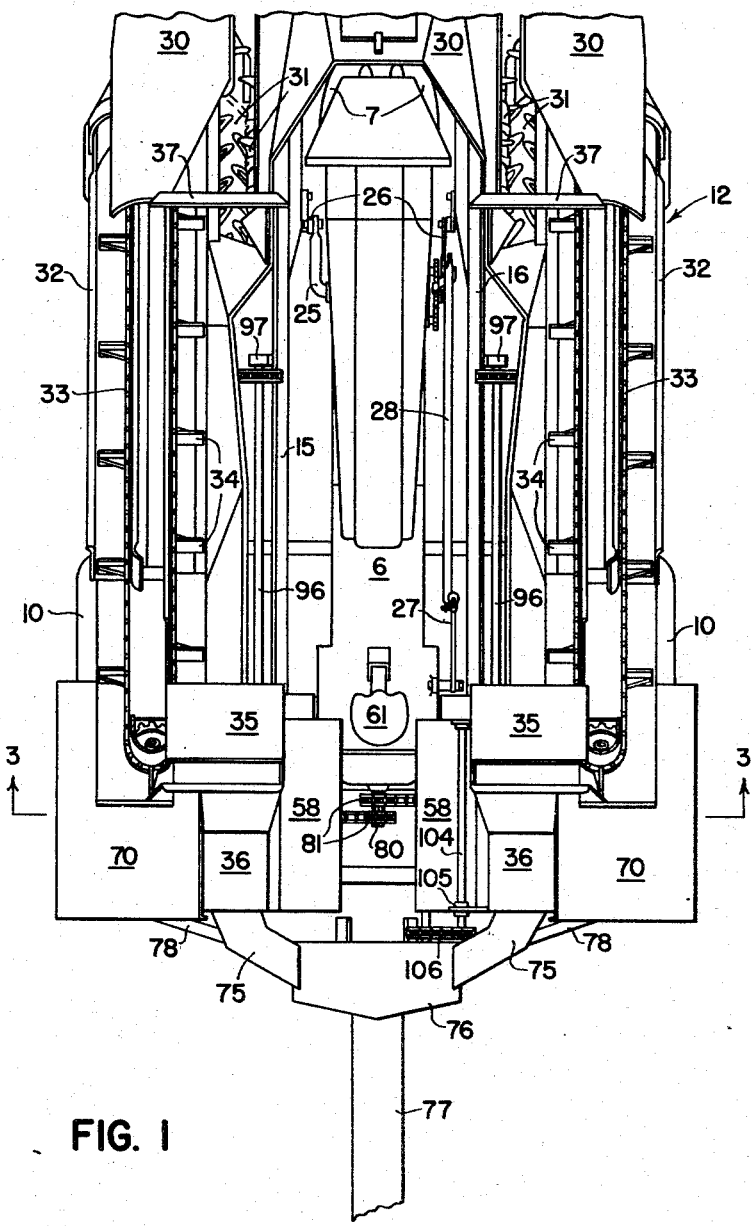
Figure 2:
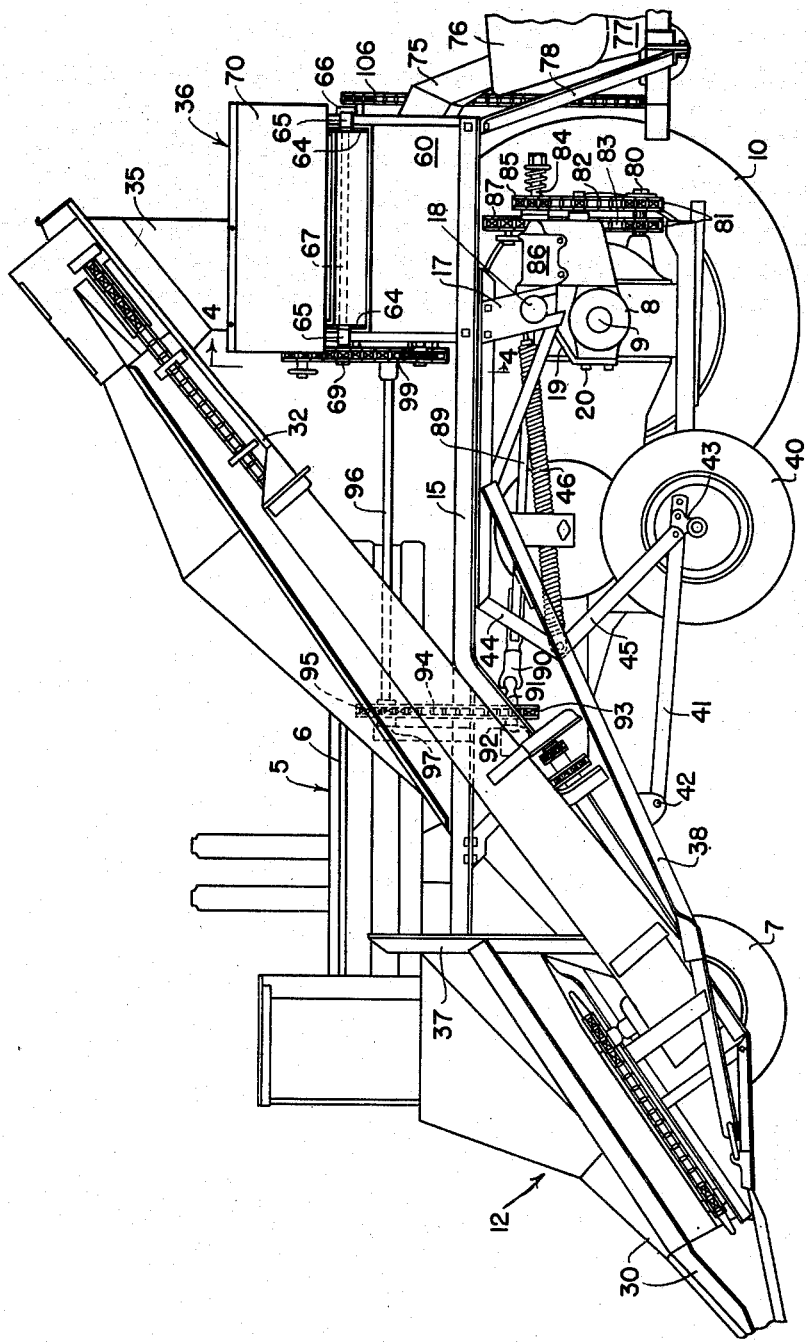
Figure 2 is a side elevational view.
Figure 3:
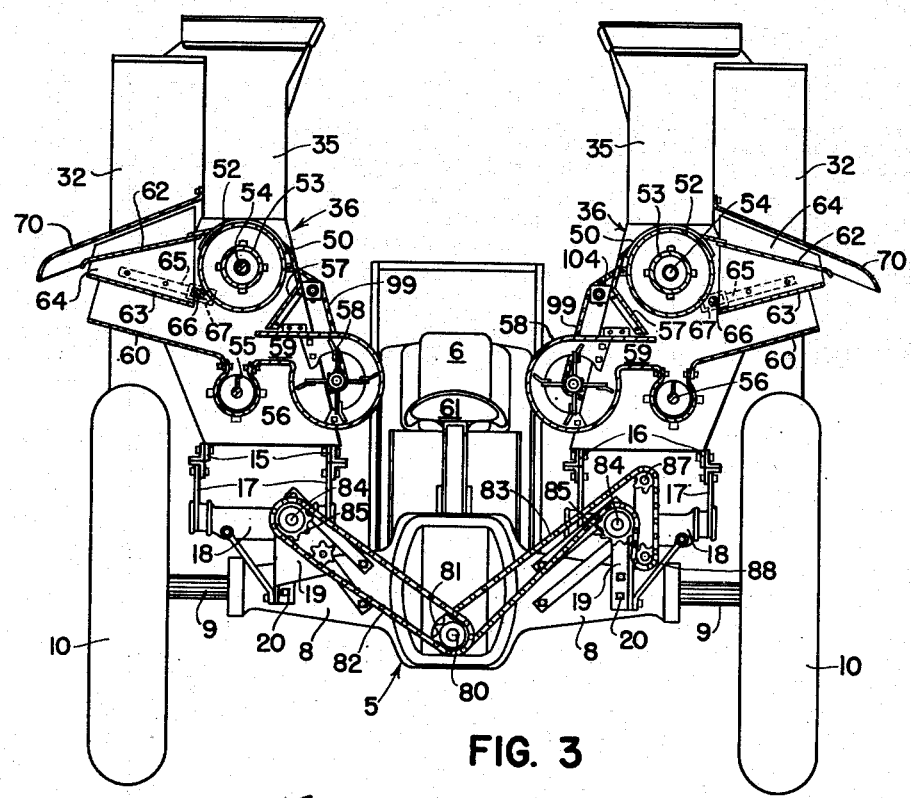
Figure 3 is a rear elevational view, taken in section along a line 3—3 in Figure 1.

Referring now to the drawings, the tractor, indicated generally by reference numeral 5, comprises a narrow longitudinally extending body 6 carried on a pair of closely spaced front dirigible wheels 7 and having a pair of laterally extending rear axle housings 8, within which are journaled the usual laterally extending driving axles 9 on which are mounted a pair of rear traction wheels 10, as is customary in the construction of conventional row crop tractors.

The corn harvesting implement, indicated in its entirety by reference numeral 12, has certain features in common with the two-row corn picker shown and described in application, Serial No. 253,386, filed January 28, 1939, by Coultas and Andrews, and comprises a pair of longitudinally extending frames 15, 16 disposed along opposite sides of the tractor body 6 and supported adjacent their rear ends on pairs of laterally spaced bifurcated brackets 17 which are rockably disposed astraddle of a pair of supporting members 18 which are mounted on brackets 19 fixed to the axle housings 8 by the usual implement mounting bolts 20 which cooperate with suitable bosses formed in the front and rear sides of the tractor axle housings.

The forward ends of the frames 15, 16 are swingably connected to a transversely disposed crank 25 by means of suitable links 26, as explained in our above-identified co-pending application, and the crank axle 25 is controlled from the tractor operator's station by means of a suitable manually controlled lever 27 connected by suitable linkage mechanism 28 to the crank axle 25 and by means of which the frames 15, 16 can be rocked vertically about the transverse axis of the supporting members 18, thus raising and lowering the forward end of the frames 15, 16 to adjust the clearance above the ground of the gatherers 30.

Each of the picking units is provided with a pair of forwardly mounted snapping rolls 31 adapted to engage the standing stalks of corn and snap the ears therefrom, from which they fall into a pair of rearwardly and upwardly inclined conveyor units 32 which extend alongside the tractor body and are supported on the implement frames 15, 16, respectively. The conveyor units each include an endless chain 33 on which is secured a plurality of ear engaging paddles 34 which propel the ears upwardly and rearwardly along the conveyor units 32 to a point substantially above the rear axle housings 8, where they discharge the ears into downwardly extending chutes 35 into the tops of the corn shellers 36, which will be described more in detail later. The gatherers 30 are supported on a pair of vertically disposed arched frame members 37 at opposite sides of the forward portion of the tractor and to which the forward ends of the longitudinal frame members 15 are connected. The conveyors 32 are supported at their lower ends on the arched frame members 37 and are braced by means of bracing members 38 which are inclined upwardly and rearwardly to a point of connection with the horizontal frames 15.

A portion of the weight of the implement is carried on a pair of laterally spaced independent supporting wheels 40, disposed under the longitudinally extending implement frames 15, 16, respectively, and connected thereto by means of forwardly extending drag links 41, each pivoted at 42 to the inclined bracing member 38 and fixed at its rearward end to the wheel hub 43. A portion of the weight of the implement is applied to the wheels 40 by means of a pair of toggle links 44, 45 for each of the wheels. The links 44, 45 are pivotally connected together and their opposite ends are pivotally connected to the implement frame 15 and to the wheel hub 43, respectively, and a tension spring 46 is connected to the pivot joint between the two links 44, 45 and is anchored to the frame supporting member 18, the tension of the spring 46 tending to straighten the toggle links 44, 45 and thus to relieve the tractor of a portion of the weight of the implement. This arrangement of independent supporting wheels for the implement is more fully described in Patent 2,169,909, granted August 15, 1939, to Andrews.

Each of the corn shellers 36 is substantially of the type disclosed in Patent 2,219,916, granted October 29, 1940, to Court, and comprises a main housing 50 including a pair of front and rear walls 51 between which are supported a cylindrical shelling cage 52. A shelling rotor 53 is supported on a shaft 54 and is disposed for rotation within the shelling cage 52, the latter being perforated to permit kernels of corn to drop therethrough into a trough 55 within which is rotatably disposed an auger conveyor 56. The falling kernels of corn are directed by an inclined wall 57 to drop through a blast of air created by a fan 58. The fan is disposed along the inside portion of the housing 50, substantially on the same level as the auger conveyor 56 and has a discharge duct 59 directing air between the shelling cage 52 and the trough 55, the air passing transversely outwardly of the tractor to carry dirt and light trash laterally away from the tractor and between a pair of inclined walls 60, 63. The walls 60, 63 are inclined inwardly to return any kernels of corn to the trough 55 that may be carried part way out of the housing by the blast of air.

The axes of the shelling cage, rotor, auger conveyor, and fan are disposed substantially parallel in a fore and aft extending direction and are generally horizontal except that inasmuch as the sheller is mounted on the frame 15 it is tilted therewith when the forward end of the frame is raised and lowered. The shellers 36 are mounted on the frame 15 above and slightly to the rear of the tractor axle housings 8 and on opposite sides of the driver's seat 61. It is to be noted that by placing the fans on the inside of the housing adjacent the driver's seat 61, and directing the blast of air laterally outwardly to either side, the dirt and chaff are discharged away from the driver, thus avoiding discomfort to the latter.

Figure 4:
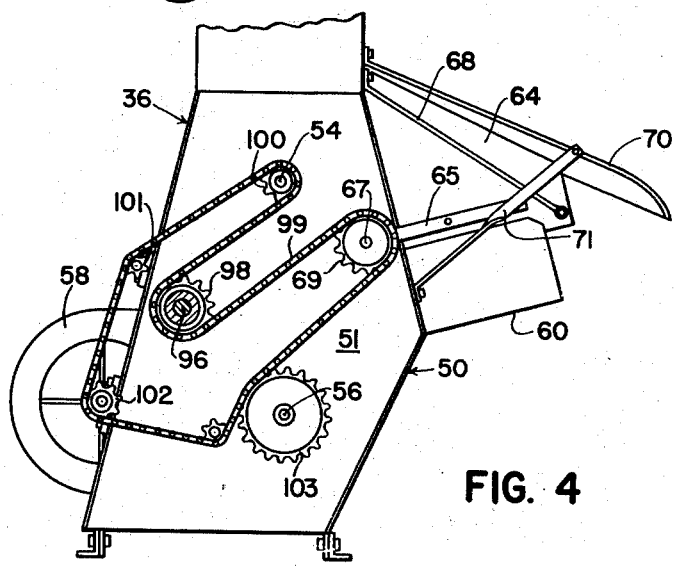
Figure 4 is a front elevational view drawn to an enlarged scale of one of the corn sheller units as viewed along a line 4—4 in Figure 2.

The corn is fed into the shelling cage 52 through a chute 35 communicating with the forward end of the top of the cage and the ears pass rearwardly through the shelling cage and are agitated by the shelling rotor 53 which removes the husks and also the kernels from the cobs and gradually works the cobs rearwardly through the cage. The cobs are discharged from the cage through an opening near the rear end thereof, which is preferably supplied with a suitable cob damper or gate, the details of which are not shown herein as they form no part of the present invention, but can be of any suitable design such as disclosed in the above-mentioned Court patent. The cobs and husks are discharged upon a cob screen 62 which is disposed alongside the shelling cage 52 and is inclined slightly downwardly and outwardly. The cob screen 62 and inwardly inclined wall 63 are supported on a pair of end plates 64 which are fixed to a pair of bracket arms 65 which are connected by means of bearing blocks 66 to eccentric members fixed to a shaft 67 journaled in the end walls 51 of the housing. The end plates 64 are suspended from the top of the housing 50 by means of a pair of suspension rods 68 connected to the lower outer corner of each of the end walls 64 and extending upwardly and inwardly to the side of the housing 50, as best indicated in Figure 4. When the shaft 67 is rotated, by means of a sprocket 69 fixed thereto at the forward end of the sheller housing 50, the eccentrics on the shaft 67 vibrate the screen 62 and wall 63 and thus agitate the cobs and husks to separate any kernels that may be discharged therewith. The cob screen 62 being perforated, allows the kernels to drop through to the wall 63 and the inclination of the screen 62 and wall 63 cause the cobs to be urged outwardly and discharged over the end of the cob screen over the traction wheel 10 and drop on the outer side thereof at the side of the tractor, while the kernels of corn are urged inwardly over the wall 63 and drop to the stationary wall 60 from where they slide into the conveyor trough 55. A downwardly and outwardly sloping roof 70 is supported at its inner end on the side wall of the chute 35 and extends over the top of the cob screen 62 to prevent cobs and husks from being blown off the screen by the wind. The outer end of each roof 70 is supported on a pair of diagonal bracing members 71 which are fixed to the side of the housing 50.

The shelled corn is moved along the conveyor trough 55 by the auger 56 in a rearward direction and is discharged from the rear end of the housing 50 into a discharge chute 75. The two discharge chutes 75 from the two corn shellers 36 are directed rearwardly and inwardly to deliver the corn to a common hopper 76, at the bottom of which is an upwardly and rearwardly extending auger conveyor, indicated by reference numeral 77, for conveying the shelled corn from the hopper 76 to a truck or wagon driven or towed behind the tractor. The hopper 76 and conveyor 77 are supported on a framework 78 which extends from beneath the conveyor 77 upwardly and outwardly to connections with the rear ends of the implement frames 15, 16, respectively.

Power is supplied for driving the picking and shelling mechanism from a power take-off shaft 80 which projects from the rear axle housing and is suitably connected to the engine of the tractor. The power take-off shaft 80 is splined and carries a pair of sprockets 81 over which are trained a pair of driving chains 82, 83, respectively, for driving the two sets of picking and shelling units, each of which is provided with a power shaft 84 journaled in a housing 86 fixed to the implement frame supporting member 18 and having a sprocket 85 on the rear ends thereof. A pair of idler pulleys 87, 88 are provided for the power transmitting chain 83 on the right hand unit to provide for driving the latter unit in the opposite direction to that of the left hand unit since the two shellers 36 are of identical construction in relatively reverse positions. Each of the power shafts 84 is connected through a rear universal joint (not shown) to a telescoping shaft 89 which is connected through a forward universal joint 90 to the end of a power shaft 91 projecting rearwardly from a gear housing 92 from which the power is distributed to drive the snapping rolls, gatherer chains and ear conveyors in a manner disclosed in the above-mentioned Coultas and Andrews application. A sprocket 93 is fixed to the shaft 91 and is connected by means of a chain 94 to drive a sprocket 95 which is fixed to a rearwardly extending shaft 96 supported at its forward end in a bearing 97 which is fixed to the inner side of the conveyor unit 32 and is journaled at its rearward end on the forward wall 51 of each of the corn sheller units 36. A sprocket 98 is fixed to each of the shafts 96 for driving a power chain 99 which is trained over a sprocket 100 on the forward end of the shelling rotor shaft 54 for driving the latter. The chains 99 then pass over an idler 101 and then over a sprocket 102 fixed to the shaft of the fan 58, and from there the chains 99 are trained over sprockets 103 on each of the auger conveyor shafts 56, after which the chains return to the driving sprocket 98 around the eccentric shaft sprocket 69. The idler 101 on the right hand sheller is fixed to a shaft 104 which extends rearwardly across the top of the fan 58 and is supported in a bearing 105 at the rear of the fan housing. The rear end of the shaft 104 is connected by means of a driving chain 106 to drive the wagon elevator conveyor 77.

We do not intend our invention to be limited to the exact details shown and described herein except as limited by the claim which follows.

We claim:

In combination with a tractor having a body including a pair of laterally extending axle housings carried on a pair of rear traction wheels, respectively, a pair of longitudinally extending implement frames disposed along opposite sides of said tractor and pivotally supported on said rear axle housings for vertical swinging movement, a pair of snapping rolls on each of said frames near the forward ends thereof, a conveyor extending rearward from each of said pairs of snapping rolls, a corn sheller mounted on the rear of each of said frames above said rear axle housings and disposed to receive ears of corn from the respective conveyor, each of said corn shellers including a shelling cage with a rotor journaled for rotation therein about a fore and aft extending axis, a trough disposed below each shelling cage for catching shelled kernels, means for discharging kernels of corn inwardly toward the center of the tractor to a common receptacle, a cob screen disposed along the outer side of each of said shellers overhanging the adjacent rear traction wheel and adapted to discharge shelled cobs and husks laterally outwardly over the tractor wheels, and a pair of fans disposed on said frames inwardly of said shellers for rotation about longitudinally extending axes and arranged to deliver blasts of air outwardly over said traction wheels and through the corn dropping from the shelling cages.

LOUIS A. PARADISE.
WILBUR J. COULTAS.